Figure 1:
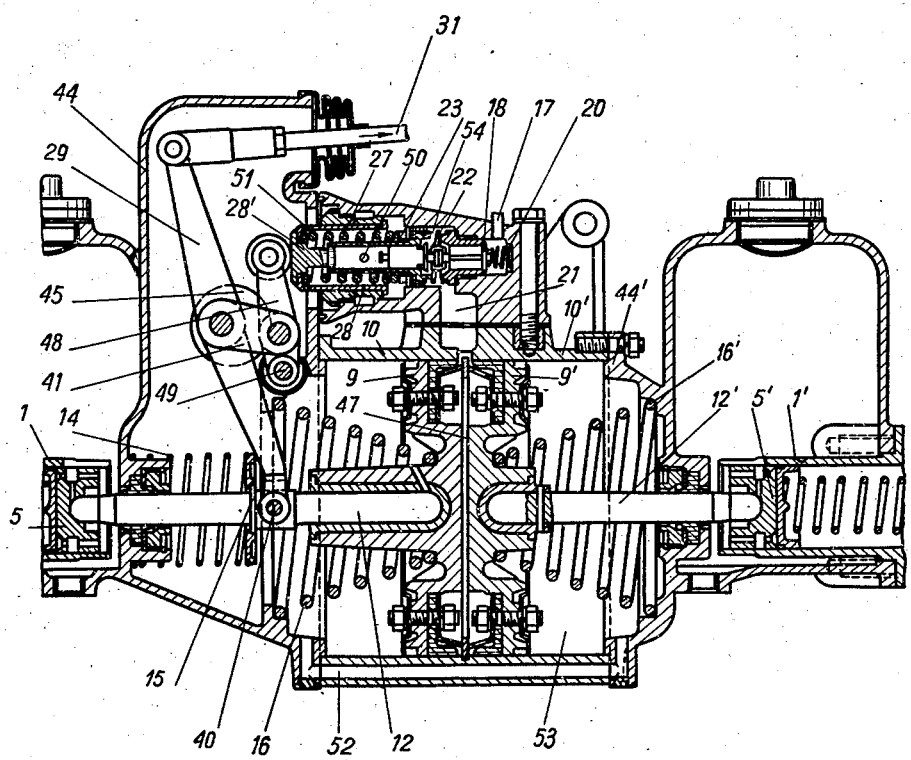

May 13, 1941.                G. ALFIERI                2,241,374
CONTROL AND ACTUATION DEVICE FOR LIQUID
PRESSURE BRAKES FOR VEHICLE WHEELS
Filed Jan. 15, 1940

UNITED STATES PATENT OFFICE 2,241,374

CONTROL AND ACTUATION DEVICE FOR LIQUID PRESSURE BRAKES FOR VEHICLE WHEELS

Giuseppe Alfieri, Milan, Italy, assignor to Fabbrica Italiana Magneti Marelli Società Anonima, Milan, Italy, a corporation of Italy Application January 15, 1940, Serial No. 314,010
In Italy January 27, 1939

2 Claims. (Cl. 121—38)

This invention is for an improvement in the devices for actuation and control of liquid pressure actuated brakes for vehicles of the class described in U. S. Patent application Ser. No. 210,061 filed May 25, 1938 in which the piston of a gas pressure operated cylinder actuates the piston of a master cylinder intended to supply pressure liquid to brake actuating cylinders, and said gas pressure operated cylinder is located in a casing having an outlet opening to outside through a filter, a control device being further provided for supplying and exhausting the operative gas into and from said gas pressure cylinder said control device exhausting within said casing.

In the devices of the above class the compressed gas which has been operative within the gas pressure cylinder expands within said casing when exhausted from said cylinder; consequently an air exhaust occurs from the device at each operation thereof and accordingly the objections as to noise and penetration of foreign matters as could happen in the case of air suction into the device are removed.

This invention has for its object a device of said class which provides for securing similar satisfactory conditions of operation in connection with devices of the above stated class having a gas pressure cylinder which contains two oppositely operative pistons and the compressed air intended to actuate both pistons is introduced, under the control of said control device, in the space intermediate said two pistons.

In a device with two opposed pistons as above outlined, any air intake as could be due to the one of said pistons which moves in the cylinder section opening in said casing which encloses the air pressure control device is compensated over and actually prevented by the supply of air exhausting from said control device, but similar conditions do not exist in connection with the cylinder section which contains the piston opposite to the first named one, said cylinder section being spaced and separate with respect to said casing.

The arrangement of this invention removes said objectionable circumstance by the fact that the end of the cylinder section which is separate from the casing is closed and is in condition to receive a portion of such air as exhausts from the cylinder and the control device; for such a purpose in a preferred embodiment of this invention said cylinder section is connected with said casing wherein the said control device exhausts.

The air which exhausts from the operative chamber of the air actuated cylinder is thus enabled to compensate for the return stroke of both pistons and accordingly it secures the above stated satisfactory operation in connection with both cylinder sections.

Figure 2:
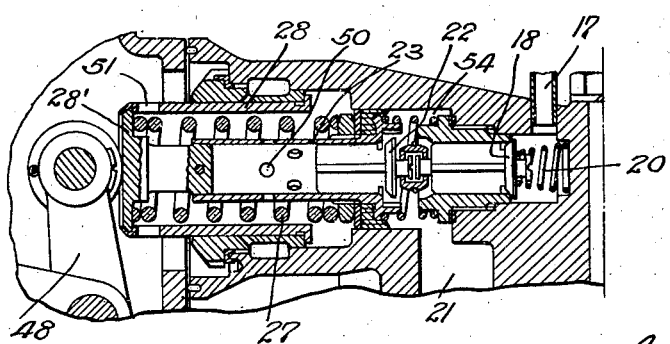

With the above and other objects in view the invention is shown in the drawing, in which:

Fig. 1 is a central longitudinal section of a preferred embodiment of the invention and Fig. 2 is an enlarged view of the valve construction shown in Fig. 1.

Referring to the drawing, 10, 10' denote a cylinder in which the opposite pistons 9, 9' reciprocate, each of said pistons being operative, against the action of a return spring 16, 16', on a stem 12, 12' which actuates the cooperating piston 5, 5' of a master cylinder 1, 1'.

The mouth of the section of the cylinder 10 in which the piston 9 reciprocates opens directly in a casing 44 in which a compressed air control device hereinafter described is located. This control device includes two intercoupled valves 18 and 22; the valve 18 is subject to the action of a return spring 20 and controls the flow of compressed air from the supply 17 thereof into a chamber 21 connected with the space 47 of cylinder 10, 10' intermediate the pistons 9, 9'; a seat 23 cooperating with the valve 22 is mounted to reciprocate in a chamber 54 and is normally held in valve-open position by a spring 27 to keep the space 47, 21 in communication with the inside of the casing 44 which in turn leads to outside through an outlet 45.

The seat 23 of the valve 22 is connected to the head 28' which in turn is connected with the sleeve 28 which acts as a guide for the seat 23. The seat 23 is actuated by an arm 48 pivoted at 49 in the casing 44 and operative on the head 28'. The lever or arm 48 is actuated, by means of a link 41, by a lever 29 which in turn is operated by a rod 31; the lever 29 is pivotally connected with the stem 12 by means of studs 40 and a return spring 14 is operative on a flange 15 of the stem 12.

At the time the rod 31 is operated in the direction of the arrow marked thereon, the seat 23 is shifted towards the valve 22; this valve thus closes the cooperating mouth of the seat 23 and subsequently on being moved thereby it moves the inlet valve 18 and causes it to open to feed compressed air from the supply 17 to the space 47. On the rod 31 and associate parts being restored in its inoperative position, firstly the valve 18 closes under the action of its spring 20 and subsequently the valve 22 is released by its own seat 23 to exhaust into the casing 44, through the ports 50, 51, such compressed air as has been supplied into the space 47 in the previous operation and has actuated the pistons 9, 9'.

The exhaust air then escapes to outside through the orifice 45 of the casing 44.

In accordance with this invention the mouth of the cylinder section 10' where the piston 9' reciprocates, is closed by a head 44' and the space 53 enclosed by said head 44' is connected with the casing 44 by means of a passage 52.

Consequently when in the above described operation the control device 18, 22, 23 exhausts air from the space 47 into the casing 44, due to the provision of the passage 52 the air pressure takes equal values in the casing 44 and in the space 53 enclosed by the head 44'; said pressure is higher than the pressure prevailing at the outside of the casing 44 owing to the expansion of compressed air exhausting from the space 47 and consequently an air excess is exhausted at each operation through the orifice 45 and no air intake may occur from outside into the casing 44 and space 53.

What I claim as my invention and desire to secure by United States Letters Patent is:

1. A device for actuation and control of liquid pressure brakes for vehicles comprising a gas pressure operated cylinder, two opposite pistons reciprocating in said cylinder, master cylinders and pistons therein each operated by one of said pistons of said gas pressure operated cylinder for supplying a pressure liquid to brake cylinders, a casing confining one end of said gas pressure cylinder and having an outlet, a control device for supplying and exhausting a pressure gas into and from the space of said gas pressure operated cylinder intermediate said pistons therein said control device exhausting in said casing, means confining a chamber at the end of said cylinder opposite to said casing closed end thereof and means for supplying into said chamber a portion of the pressure gas exhausted by said control device.

2. A device for actuation and control of liquid pressure brakes for vehicles comprising a gas pressure operated cylinder, two opposite pistons reciprocating in said cylinder, master cylinders and pistons therein each operated by one of said pistons of said gas pressure operated cylinder for supplying a pressure liquid to brake cylinders, a casing confining one end of said gas pressure cylinder and having an outlet, a control device for supplying and exhausting a pressure gas into and from the space of said gas pressure operated cylinder intermediate said pistons therein said control device exhausting in said casing, means confining a chamber at the end of said cylinder opposite to said casing closed end thereof and a passage interconnecting said casing and chamber for supplying to said chamber a portion of the pressure gas exhausted by said control device into said casing.

GIUSEPPE ALFIERI.